United States Patent
Katano (10) Patent No.: US 8,153,321 B2
(45) Date of Patent: Apr. 10, 2012

(54) FUEL CELL SYSTEM HAVING SWITCHING FUEL FLOW

(75) Inventor: Koji Katano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 983 days.

(21) Appl. No.: 10/583,776

(22) PCT Filed: Feb. 2, 2005

(86) PCT No.: PCT/JP2005/001877
§ 371 (c)(1),
(2), (4) Date: Jun. 21, 2006

(87) PCT Pub. No.: WO2005/076393
PCT Pub. Date: Aug. 18, 2005

(65) Prior Publication Data
US 2007/0154751 A1 Jul. 5, 2007

(30) Foreign Application Priority Data
Feb. 10, 2004 (JP) .................. 2004-033257

(51) Int. Cl.
*H01M 8/00* (2006.01)
*H01M 8/10* (2006.01)
(52) U.S. Cl. ......... 429/444; 429/415; 429/455; 429/513
(58) Field of Classification Search .............. None
See application file for complete search history.

(56) References Cited

U.S. PATENT DOCUMENTS

| 6,093,502 | A | 7/2000 | Carlstrom, Jr. et al. |
| 6,569,549 | B1 | 5/2003 | Sawyer |
| 2002/0177020 | A1 | 11/2002 | Lio |
| 2003/0165725 | A1 | 9/2003 | Kudou et al. |
| 2004/0038114 | A1* | 2/2004 | Wariishi et al. ............. 429/38 |

FOREIGN PATENT DOCUMENTS

| JP | A 9-312167 | 12/1997 |
| JP | A 11-144753 | 5/1999 |
| JP | A 2003-77506 | 3/2003 |
| JP | A-2003-100320 | 4/2003 |
| WO | WO 02/089244 A | * 11/2002 |
| WO | WO 02/089244 A1 | 11/2002 |
| WO | WO 2004/102707 A2 | 11/2004 |

OTHER PUBLICATIONS

Apr. 19, 2011 Office Action issued in Japanese Application No. 2004-033257 (with translation).

* cited by examiner

*Primary Examiner* — Keith Walker
(74) *Attorney, Agent, or Firm* — Oliff & Berridge, PLC

(57) ABSTRACT

A fuel cell system (100) includes two supply passages (30, 32) for supplying the hydrogen to the anode (14). Valves (22, 23) which control flow amounts of the hydrogen passing through the two supply passages (30, 32) are provided. An exhaust passage (34) which outputs exhaust gas from the anode (14) is provided on the supply passage, and a valve (24) is also provided. When the valve (24) on the exhaust passage (34) is closed, the flow amount ratios of the hydrogen passing through the two supply passages (30, 32) are varied in time. Therefore, impurities such as nitrogen can be diffused. Thereby, a hydrogen purge amount can be reduced.

7 Claims, 10 Drawing Sheets

FUEL CELL SYSTEM HAVING SWITCHING FUEL FLOW

BACKGROUND OF THE INVENTION

1. Field of the Invention

This invention relates to a fuel cell system, and more particularly to an improvement of efficiency in using a full gas.

2. Description of Related Art

There is known a fuel cell system loaded on a fuel cell automobile and the like. The fuel cell system has a fuel cell stack, as a main body, which is constructed by an anode (i.e., a hydrogen electrode or a fuel electrode) and a cathode (i.e., an oxygen electrode). The fuel cell system also has a tank which stores fuel gas such as hydrogen supplied to the anode, a pump which returns exhaust gas including unused fuel gas to the original anode and the like. In the fuel cell stack, the hydrogen and the oxygen included in the air react on each other to generate an electric power.

In the fuel cell system, as a cell reaction proceeds, nitrogen in oxidized gas as well as water and moisture for humidification pass through an electrolyte membrane from the cathode, and exude to the side of the anode. Therefore, partial pressure of the nitrogen and the moisture (hereinafter, referred to as "impurities") increases, and concentration of unused fuel gas in the exhaust gas decreases. Thereby, a power generation ability of the fuel cell stack decreases.

In this view, there is known such a technique that an opening and closing valve provided on an exhaust passage on the side of the anode is opened (i.e., "hydrogen purge") and gas including unused gas and the impurities is supplied to a sub fuel cell stack provided at a downstream position, when it is determined that a power generation ability of the fuel cell stack decreases. This technique is disclosed in Japanese Patent Application Laid-open under No. 2003-77506. In addition, there is known such a technique that impurities in a supply passage in a fuel cell stack, to which fuel gas is supplied, is discharged outside by opening a cutoff valve provided at an exhaust opening, when it is determined that an output voltage of the fuel cell stack decreases. This technique is disclosed in Japanese Patent Application Laid-open under No. 9-312167. Further, there is known such a technique that, in a fuel cell system having plural supply openings and exhaust openings, fuel is supplied from the plural supply openings for the purpose of diffusing the fuel gas on an inside surface of a fuel cell system. This technique is disclosed in Japanese Patent Application Laid-open under No. 11-144753.

However, in the above-mentioned fuel cell systems, since the impurities accumulate at one portion in the fuel cell stack, the power generation efficiency in the entire fuel cell stack sometimes deteriorates. Further, in order to prevent such deterioration of the power generation efficiency, a hydrogen purge amount should be sometimes increased.

SUMMARY OF THE INVENTION

The present invention has been achieved in order to solve the above problems. It is an object of this invention to provide a fuel cell system capable of preventing accumulation of impurities at one portion in a fuel cell stack and improving the efficiency of using fuel.

According to one aspect of the present invention, there is provide a fuel cell system including: a fuel cell stack having an anode and a cathode; a first and a second supply passages which communicate with each other in the fuel cell stack and supply fuel gas to the anode, respectively; an exhaust passage which is connected to the second supply passage and discharges exhaust gas from the anode; an opening and closing unit which opens and closes the exhaust passage; and a flow amount controlling unit which controls flow amounts of the fuel gas passing through the first supply passage and the second supply passage, respectively, wherein the flow amount controlling unit varies a ratio between the flow amounts passing through the first supply passage and the second supply passage, when the exhaust passage is closed.

The above fuel cell system is loaded on a fuel cell automobile and the like. The fuel cell stack is constructed by the anode and the cathode, and the electric power is generated by supplying the fuel gas such as hydrogen to the anode and supplying air (i.e., oxygen) to the cathode. The above-mentioned fuel cell system has two supply passages, i.e., the first and the second passages which supply the fuel gas to the anode. Also, the system has the flow amount controlling unit which controls the flow amounts of the fuel gas passing through those two supply passages. Further, the system has the exhaust passage which is connected to the second supply passage and outputs the exhaust gas from the anode. In the exhaust passage, the opening and closing unit such as the valve is provided, for example. Preferably, the first and the second supply passages may be provided such that the fuel gas supplied from the first supply passage and the second supply passage flow in opposite directions within the anode.

In the above-mentioned fuel cell system, when the opening and closing unit provided on the exhaust passage is closed, the flow amount controlling unit executes the control such that the flow amount ratios of the first and second supply passages vary in terms of time. Thereby, an extreme downstream position of the fuel gas can be varied. The "extreme downstream position" is the position where the fuel gas supplied via the first and the second supply passages meet with each other and consumed for the cell reaction, and as a result the flow rate of the fuel gas becomes zero. The extreme downstream position can be moved in the anode we well as in the first and the second supply passages by controlling the flow amounts of the fuel gas. Therefore, the impurities such as the nitrogen can be diffused within the anode. Thus, hydrogen purge amount for discharging the impurities can be reduced, and the efficiency of using the fuel gas can be improved. Additionally, by varying the extreme downstream position of the fuel gas, not only the diffusion of the impurities but also the diffusion of dew water can be carried out. Thereby, flooding in the anode can be prevented. Further, since it becomes possible to efficiently use the dew water as humidification water in the fuel cell stack, dryout of the fuel cell stack can be prevented.

The flow amount controlling unit may control the flow amount such that an extreme downstream position of the fuel gas coincides with a position at which the exhaust passage is connected to the second supply passage, when the opening and closing unit is open. When the opening and closing unit provided on the exhaust passage is open, the impurities in the anode is discharged with unused hydrogen. In the above-mentioned fuel cell system, at the time of discharging the impurities, the flow amount is controlled so that the extreme downstream position of the hydrogen coincides with the position at which the exhaust passage is arranged. Thereby, the impurities can be effectively exhausted.

In a preferred embodiment, the flow amount controlling unit may control the flow amounts such that the flow amounts of the fuel gas intermittently vary. For example, the valve supplying the hydrogen is intermittently controlled. Further, the flow amount controlling unit may shift a time period in which the fuel gas is supplied to the anode through the first supply passage from a time period in which the fuel gas is supplied to the anode through the second supply passage. Thereby, the pulsation can be introduced to the flow of the fuel gas in the anode, and the extreme downstream position in the anode can be finely and quickly moved. Therefore, the impurities can be effectively diffused.

In another preferred embodiment, the fuel cell system may further include an flow amount calculating unit which calculates a required flow amount of the fuel gas to be supplied to the fuel cell stack based on a state of the fuel cell stack, and the flow amount controlling unit may control the flow amounts of the fuel gas such that a total of the flow amounts of the fuel gas supplied from the first and the second supply passages to the anode corresponds to the required flow amount calculated by the flow amount calculating unit. Thereby, the hydrogen of the necessary flow amount can be supplied to the fuel cell stack, and the necessary power generation amount can be maintained.

In an embodiment, the exhaust passage may be connected to the second supply passage at the position between the fuel stack and the opening and closing unit. Thereby, the extreme downstream position of the hydrogen can be moved within a large range in the almost entire fuel cell stack. Therefore, the impurities in the anode can also be diffused within the large range, and the hydrogen purge amount can be further reduced. Moreover, since a power generation distribution of an inside surface of the anode can be further equalized, durability of the fuel cell stack can also be improved. It is preferable that a volume of the second supply passage between the anode and the exhaust passage is small. Thereby, without increasing the discharging amount of unused hydrogen, the impurities can be efficiently discharged.

According to another aspect of the present invention, there is provided a method of supplying fuel gas to a fuel cell system including a fuel cell stack having an anode and a cathode; a first and a second supply passages which communicate with each other in the fuel cell stack and supply fuel gas to the anode, respectively; and an exhaust passage which is connected to the second supply passage and discharges exhaust gas from the anode, the method including the steps of: a step of opening and closing the exhaust passage; and a step of controlling flow amounts of the fuel gas passing through the first supply passage and the second supply passage, respectively, wherein the step of controlling flow amounts varies a ratio between the flow amounts passing through the first supply passage and the second supply passage, when the exhaust passage is closed. By executing the above method, hydrogen purge amount for discharging the impurities can be reduced, and the efficiency of using the fuel gas can be improved.

DETAILED DESCRIPTION OF THE PREFERRED EMBODIMENTS

The preferred embodiments of the present invention will now be described below with reference to the attached drawings.

[Configuration of Fuel Cell System]

Figure 1:
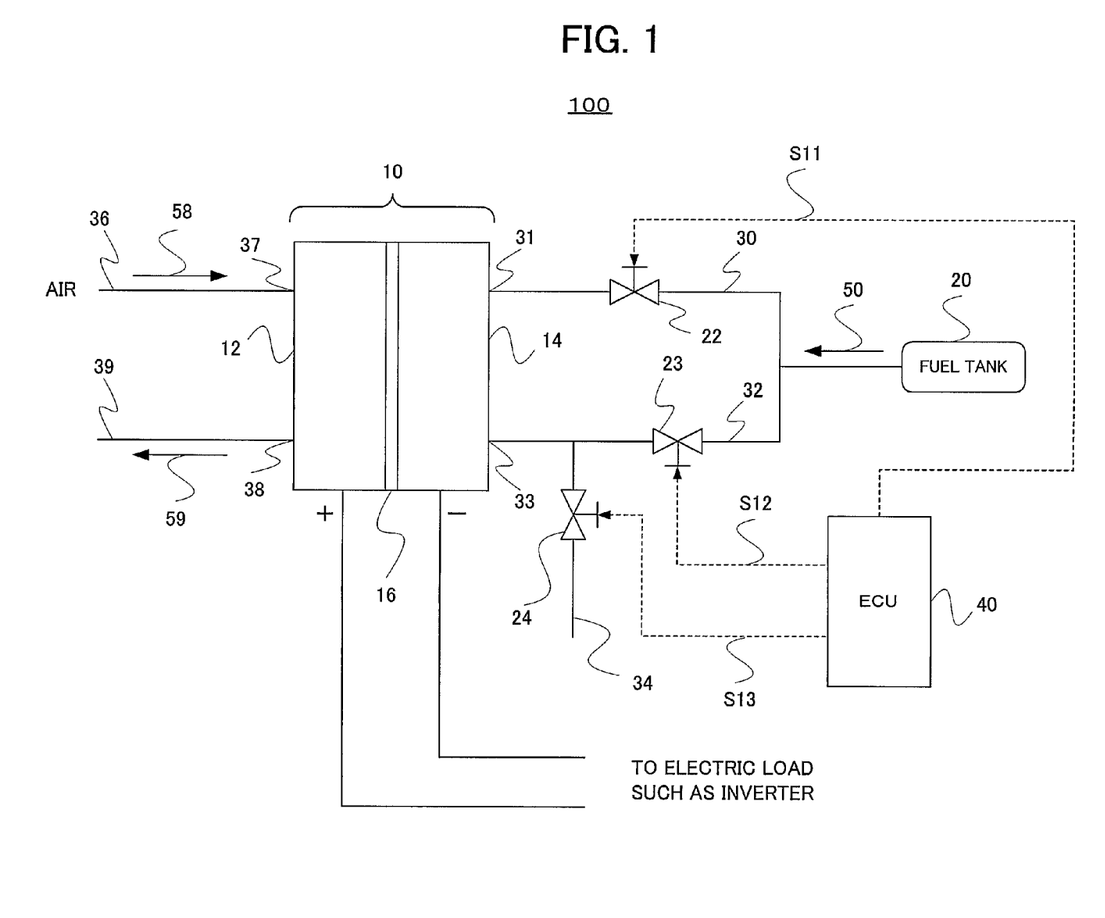
FIG. 1 is a block diagram showing a schematic configuration of a fuel cell system according to an embodiment of the present invention.

FIG. 1 is a diagram schematically showing a configuration of a fuel cell system according to an embodiment of the present invention.

In FIG. 1, a fuel cell system 100 mainly includes a fuel cell stack 10, a fuel tank 20, an ECU (Engine Control Unit) 40, valves 22 to 24, hydrogen supply passages 30 and 32, hydrogen supply openings 31 and 33, a hydrogen exhaust passage 34, an air supply passage 36, an air supply opening 37, an air exhaust opening 38 and an air exhaust passage 39. The fuel cell system 100 is loaded on a fuel cell automobile (hereinafter, simply referred to as "vehicle").

The fuel cell stack 10 is manufactured by stacking cells with conductive separators sandwiched between the cells. The cell has an electrolyte membrane 16, and electrodes having a configuration of a porous layer capable of diffusing gas and formed on both surfaces of the electrolyte membrane 16. An output voltage according to a number of stacked cells can be obtained from the fuel cell stack 10. In FIG. 1, only the configuration of the cell in which a cathode (air electrode) 12 and an anode (fuel electrode) 14 are formed on the surfaces of the electrolyte membrane 16 is shown, for convenience of the illustration.

The fuel cell stack 10 is a power supply source of a motor for driving a vehicle, and is configured to generate a direct current of high voltage about 300V. The generated voltage by the fuel cell stack 10 is outputted to an inverter (not shown) supplying, to the motor, a current according to a designated torque. In addition, the generated voltage of the fuel cell stack 10 is reduced by a DC-DC converter and then outputted to various kinds of accessories loaded on the vehicle and a battery serving as a secondary cell for power supply to the accessories.

In an embodiment, fuel gas (hereinafter, simply referred to as "hydrogen") is supplied to the fuel cell stack 10 from two positions, i.e., the hydrogen supply openings 31 and 33. The hydrogen supplied from the fuel tank 20 is divided into hydrogen passing through the hydrogen supply passage 30 and hydrogen passing through the hydrogen supply passage 32, and they are supplied from the hydrogen supply openings 31 and 33 to the anode 14, respectively. The hydrogen supply passage 30 serves as a first supply passage, and the hydrogen supply passage 32 serves as a second supply passage. As illustrated, the hydrogen supply passage 30 and the hydrogen supply passage 32 communicate with each other in the fuel cell stack 10.

In the hydrogen supply passages 30 and 32, valves 22 and 23 serving as the flow amount controlling valves for controlling the flow amount of the passing hydrogen are provided, respectively. The valves 22 and 23 are electromagnetic two-way valves, and are controlled by control signals (such as control pulse signals and the like) S11 and S12 supplied from the ECU 40, respectively. The control is hereinafter referred to as "flow amount control". The valves 22 and 23 are opened and closed according to a duty ratio of the control pulse supplied to the solenoid coil of the electromagnetic valve. Therefore, based on the above-mentioned control signals S11 and S12, the flow amounts of the hydrogen passing through the valves 22 and 23 are controlled. It is noted that the control signals S11 and S12 will be explained later in detail.

The valves 22 and 23 may be components, constructed by a motor such as a step motor, capable of adjusting an opening degree amount. In this case, the ECU 40 inputs, to the valves 22 and 23, the control signals S11 and S12 indicating the opening degree amount to be set to the valves 22 and 23.

The hydrogen exhaust passage 34 is connected to the hydrogen supply passage 32 at the position between the valve 23 and the hydrogen supply opening 33. Further, in the hydrogen exhaust passage 34, the valve 24 is provided. The valve 24 is controlled by the control signal S13 supplied from the ECU 40. By the control, the opening and closing of the valve 24 or the adjustment of the opening degree amount of the valve 24 is performed. Thereby, the flow amount of the gas passing through the hydrogen exhaust passage 34 (i.e., gas including unused hydrogen and the above-mentioned impurities, and hereinafter simply referred to as "exhaust gas") is controlled. When the valve 24 is closed, the exhaust gas does not pass through the hydrogen exhaust passage 34. However, when the valve 24 is open, the exhaust gas outputted from the anode 14 is discharged from the hydrogen exhaust passage 34.

The air passes through the air supply passage 36 as shown by an arrow 58, and is supplied from the air supply opening 37 into the cathode 12. The air outputted from the cathode 12 passes through the air exhaust opening 38 and the air exhaust passage 39 as shown by an arrow 59, and is discharged.

The ECU 40 is configured by a CPU, a ROM, a RAM, an A/D converter, an input and output interface and the like, which are not shown. As described above, by supplying the control signals S11 to S13 to the valves 22 to 24, respectively, the ECU 40 performs the opening and closing of the valves or the adjustment of the opening degree amount of the valves. At that time, the ECU 40 determines the control signals S11 to S13 based on the driving state of the vehicle and a current state of the valves. A specific control of the flow amount executed by the ECU 40 will be explained later in detail.

Next, the description will be given of the flow of the gas in the fuel cell stack 10 when the flow amount of the gas is varied by controlling the above-mentioned valves 22 to 24, with reference to FIG. 2 to FIG. 5.

Figure 2A:
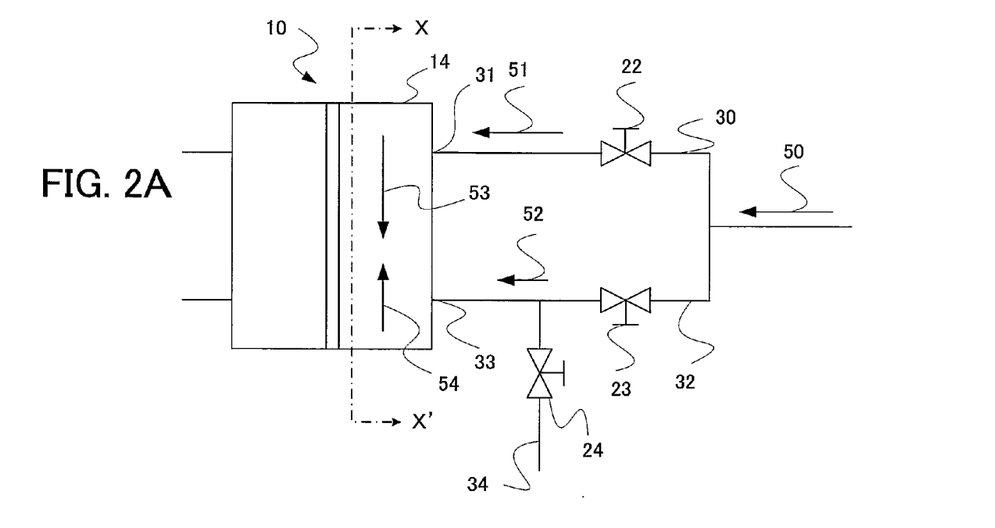
FIGS. 2A and 2B are diagrams showing a flow of hydrogen in flow passages at a time of controlling a valve.
Figure 2B:
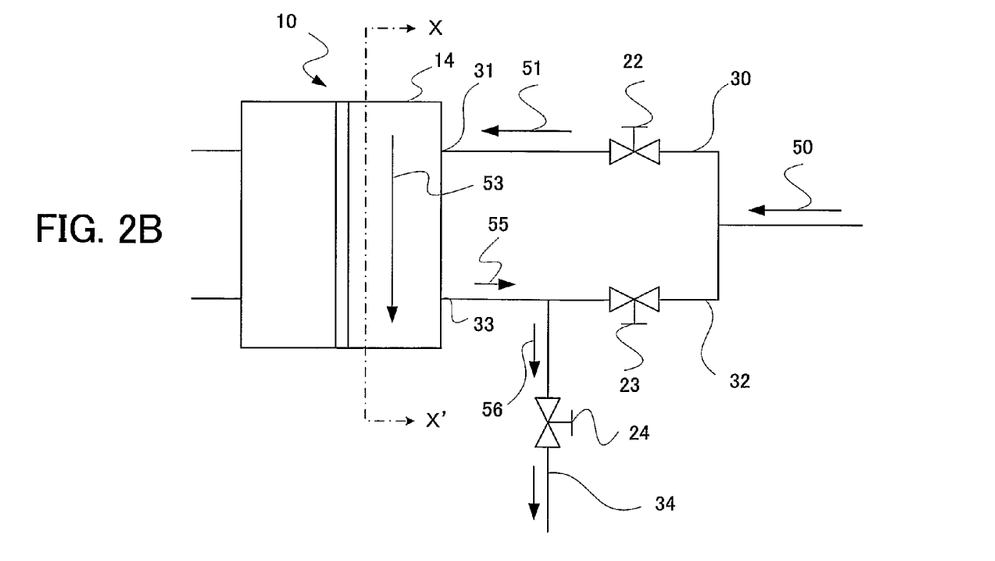

FIGS. 2A and 2B show the flow of the gas in the hydrogen supply passages 30 and 32 and the hydrogen exhaust passage 34 when the valves 22 to 24 are controlled.

FIG. 2A is a diagram showing the flow of the hydrogen when the valves 22 and 23 are opened and the valve 24 is closed. It is prescribed that the duty ratio of the control pulse supplied to the valve 22 is larger than the duty ratio of the control pulse supplied to the valve 23. Namely, it is prescribed that the flow amount of the fuel gas passing through the valve 22 is larger than the flow amount of the fuel gas passing through the valve 23. As shown in FIG. 2A, the hydrogen (shown by a reference numeral 50) supplied from the fuel tank 20 is divided into the hydrogen (shown by an arrow 51) passing through the hydrogen supply passage 30 and the hydrogen (shown by an arrow 52) passing through the hydrogen supply passage 32, and they flow from the hydrogen supply openings 31 and 33 into the anode 14, respectively.

Therefore, there occur two-way flows in the opposite or counter directions (shown by arrows 53 and 54) within the anode 14. In this case, no gas flows in the hydrogen exhaust passage 34.

FIG. 2B is a diagram showing the flow of the hydrogen when the valves 22 and 24 are opened and the valve 23 is closed. As shown in FIG. 2B, the hydrogen (shown by the arrow 50) supplied from the fuel tank 20 passes only through the valve 22. In the anode 14, there occurs the one-way flow shown by an arrow 53. The impurities (i.e., exhaust gas) such as the hydrogen unused for the reaction in the fuel cell stack 10 and the nitrogen in the anode 14 are discharged from the hydrogen supply opening 33, as shown by the arrow 55. The exhaust gas passes through the hydrogen exhaust passage 34 as shown by an arrow 56, and is discharged. In the fuel cell system 100 according to the present embodiment, the hydrogen exhaust passage 34 is provided at a position which becomes an extreme downstream position of the hydrogen when the valve 24 is open. Specifically, the hydrogen exhaust passage 34 is connected to the second supply passage 32 at a position between the anode 14 and the valve 23. Thereby, the impurities in the anode 14 can be efficiently discharged. Although FIG. 2B shows the example in which the valve 23 is closed, the gas can be discharged from the hydrogen exhaust passage 34 even if the valve 23 is open, as described above.

Figure 3A:
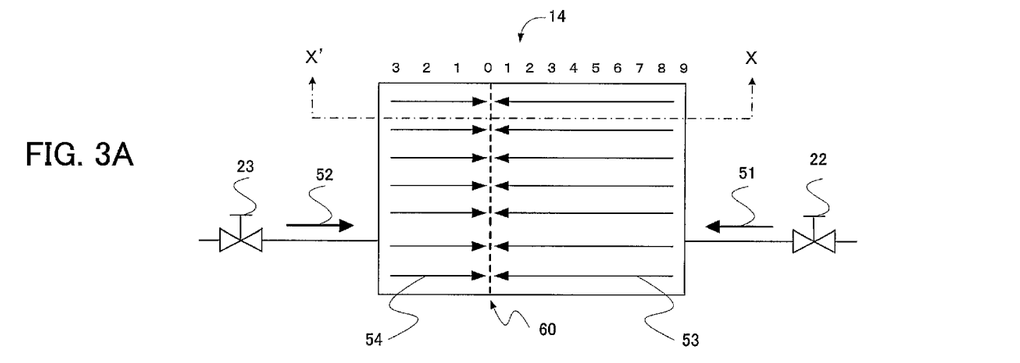
FIGS. 3A and 3B are diagrams showing a flow of hydrogen in an anode at the time of controlling the valve.
Figure 3B:
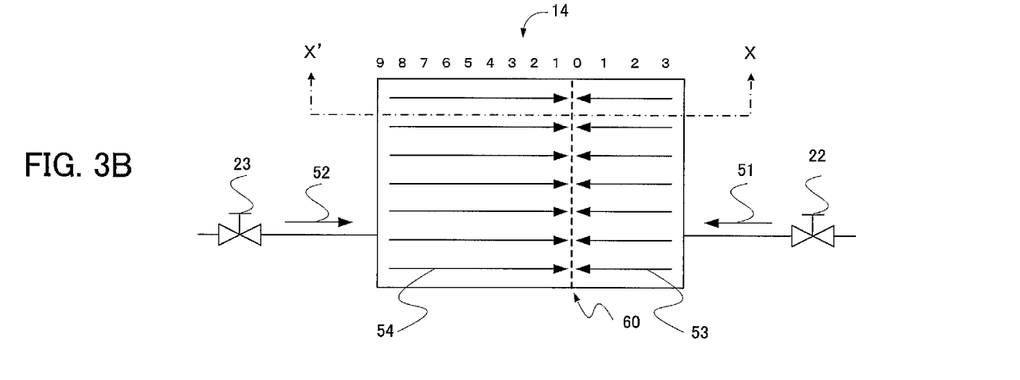

Next, the detailed description will be given of the flow of the hydrogen in the anode 14 with reference to FIGS. 3A and 3B showing cross-sectional views of the anode 14 taken alone the cutting-plane line X-X' shown in FIGS. 2A and 2B.

FIG. 3A shows a case in which the valve 22 is controlled at the duty ratio 30% and the valve 23 is controlled at the duty ratio 10%. Numerals indicated at an upper portion of the anode 14 in FIG. 3A shows a hydrogen amount (i.e., flow speed of the hydrogen). As shown in FIG. 3A, the hydrogen (shown by the arrow 53) supplied from the valve 22 and the hydrogen (shown by an arrow 54) supplied from the valve 23 are consumed for the reaction in the anode 14, and as a result, the hydrogen amount becomes 0 at a position shown by a reference numeral 60. The position is the extreme downstream position at which the flow speed of the hydrogen becomes 0. In other words, the extreme downstream position is the position where the fuel gas is consumed by the reaction in the anode or the position where the fuel gas supplied through the hydrogen supply passages 30 and 32 meet with each other, when the fuel gas is supplied to the anode 14 through both of the hydrogen supply passages 30 and 32.

FIG. 3B shows a case in which the valve 22 is controlled at the duty ratio 10% and the valve 23 is controlled at the duty ratio 30%. As shown in FIG. 3B, it is understood that the extreme downstream position 60 moves in the right side in comparison with the extreme downstream position 60 shown in FIG. 3A.

Figure 4A:
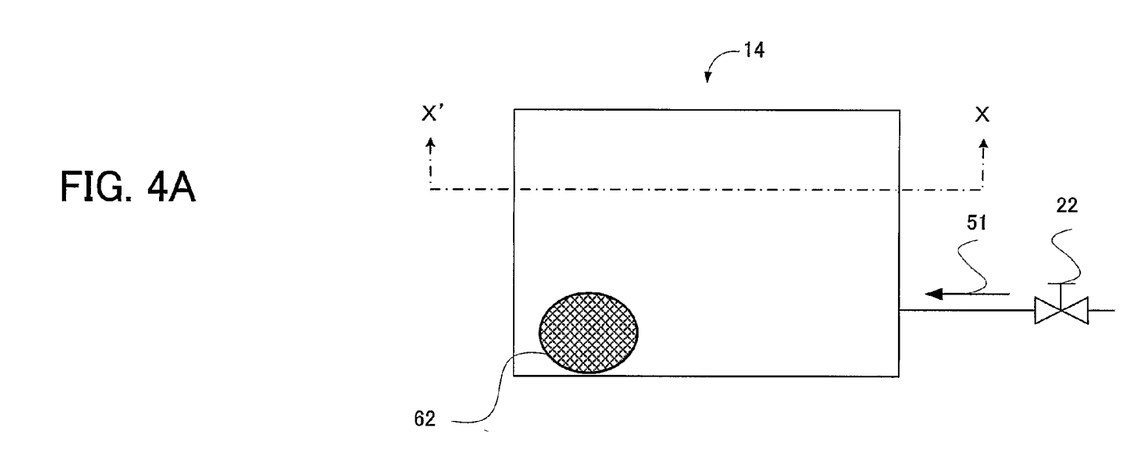
FIGS. 4A and 4B are diagrams showing states of impurities in the anode.
Figure 4B:
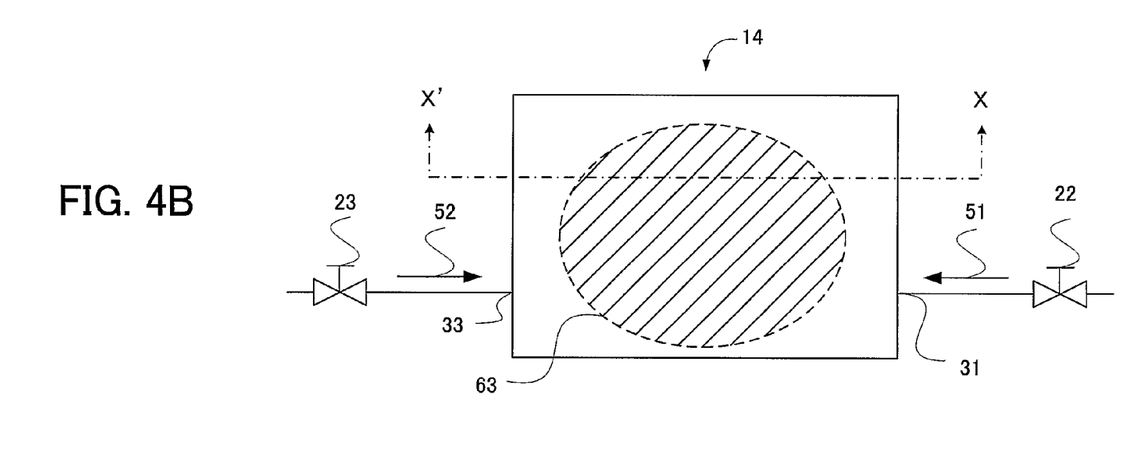

FIGS. 4A and 4B are also cross-sectional views of the anode 14 taken alone the cutting-plane line X-X' shown in FIGS. 2A and 2B. The description will be given of a state of the impurities in the anode 14 with reference to FIGS. 4A and 4B.

FIG. 4A shows a state in which the impurities in the anode 14 accumulate in a fuel cell system normally used. In this case, the hydrogen is supplied only from the valve 22 to the anode 14 (shown by the arrow 51). Therefore, there occurs the one-way flow of the hydrogen in the anode 14, and the extreme downstream position of the hydrogen is fixed at an edge portion of the anode 14. As a result, the impurities 62 accumulate at the extreme downstream position as shown in FIG. 4A.

FIG. 4B shows a state in which the impurities in the anode 14 accumulate in the fuel cell system 100 according to the present embodiment. In the fuel cell system 100 according to the present embodiment, the hydrogen is supplied from two openings 31 and 33 to the anode 14 in two, opposite directions. Moreover, as described above with reference to FIGS. 3A and 3B, by controlling the duty ratios of the valves 22 and 23, the extreme downstream position 60 of the hydrogen in the anode 14 can be moved. Therefore, the impurities 63 are not concentrated at one portion, but are diffused to the substantially entire area of the anode 14 as shown in FIG. 4B.

In the fuel cell system according to the present embodiment, not only the above diffusion of the impurities but also the diffusion of dew water can be simultaneously performed. Thereby, flooding in the anode 14 can be prevented. Further, it becomes possible to effectively use the dew water as humidification water in the fuel cell stack 10. Thereby, dryout of the fuel cell stack 10 can be prevented.

Figure 5:
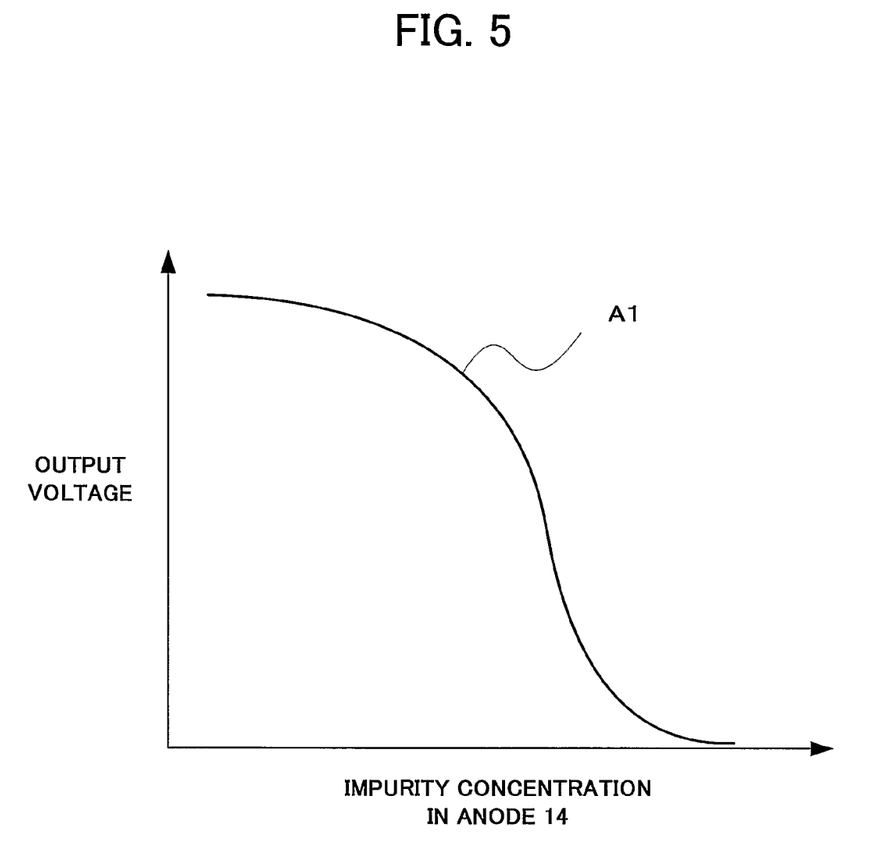
FIG. 5 is a graph showing a relation between an impurity concentration in the anode and an output voltage of a fuel cell stack.

FIG. 5 shows a relation between an impurity concentration in the anode 14 and an output voltage of the fuel cell stack 10. The relation of the output voltage of the fuel cell stack 10 with respect to the impurity concentration is generally shown by a characteristic curve A1. As shown in FIG. 5, it is understood that the output voltage of the fuel cell stack 10 extremely decreases when the impurity concentration reaches a certain concentration.

FIGS. 4A and 4B will be explained again in consideration of the characteristic of FIG. 5.

As shown in FIG. 4A, it is understood that if the impurities 62 accumulate at one portion, the output voltage at the position extremely decreases Therefore, an output performance in the entire fuel cell stack 10 sometimes largely deteriorates. Thus, generally, by moderately performing the hydrogen purge, the deterioration of the output performance of the entire fuel cell stack 10 is prevented.

On the other hand, as shown in FIG. 4B, if the impurities 63 are diffused, the impurity concentration per unit volume becomes low. Therefore, the output performance of the entire fuel cell stack 10 hardly deteriorates extremely. Thereby, in order to discharge the impurities 63 in the anode 14, a number of discharging the gas (in the present embodiment, it is performed by opening the valve 24) can be reduced. Namely, the hydrogen purge amount can be reduced. In addition, since the power generation distribution of the inside surface of the anode 14 can be further equalized, durability of the fuel cell stack 10 can be improved, too.

It is preferable that the above-mentioned fuel cell system 100 is configured such that the volume of the flow passage between the valves 23 and 24 is small. Namely, it is preferable that the fuel cell system 100 is configured such that the distance of the flow passage between the valves 23 and 24 is short. This is because the system having the smaller flow passage volume can discharge much more impurities when it is compared in a case that the discharged hydrogen amount is identical at the time of the hydrogen purge. That is, when the impurities are discharged with the valve 24 open at the time of the hydrogen purge, the flow passage between the valves 23 and 24 becomes the portion at which the impurities easily accumulate. Therefore, by making the flow passage volume small, the impurities can be securely discharged.

It is preferable that each maximum passable flow amount of the valves 22 and 23 is equal to or larger than a half of the maximum flow amount required by the fuel cell stack 10, or the total of the maximum passable flow amounts of the valves 22 and 23 is equal to or larger than the maximum flow amount required by the fuel cell stack 10. By configuring each valve in this manner, the required power generation amount can be maintained.

Figure 6:
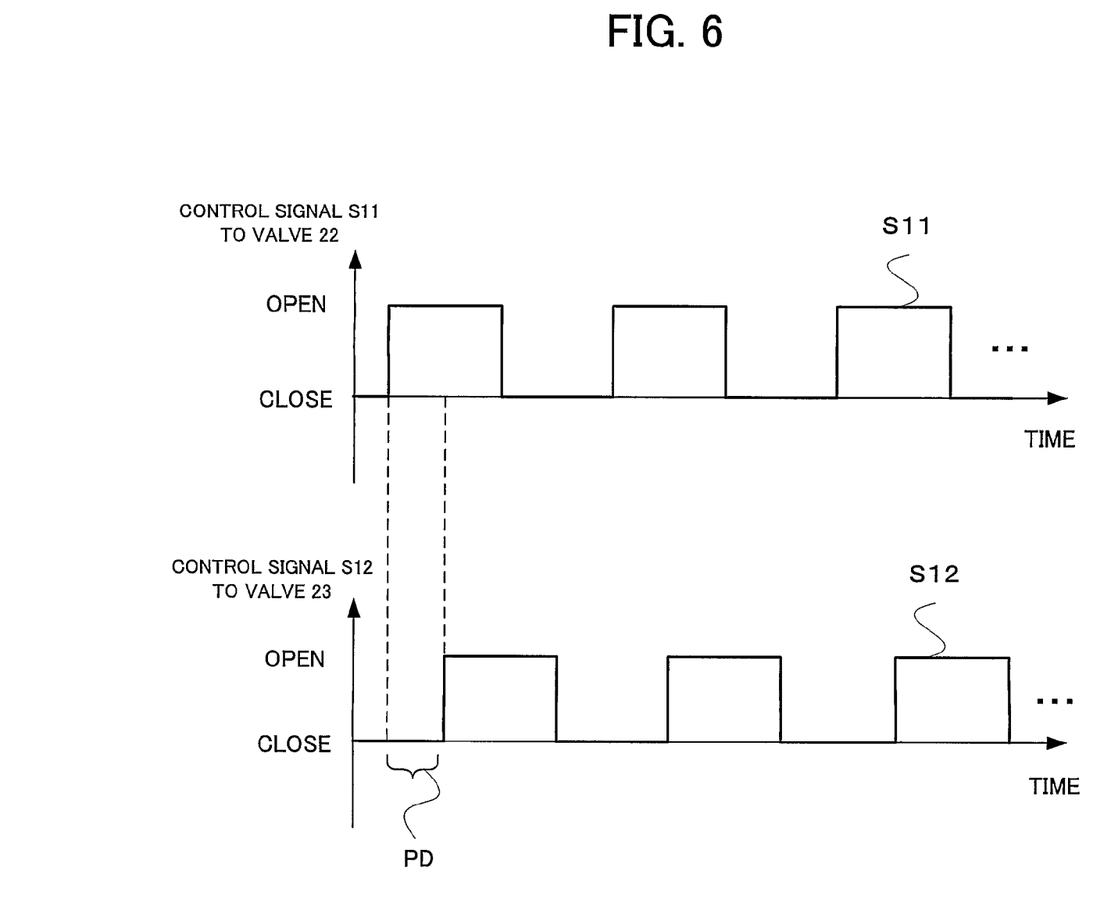
FIG. 6 is a diagram showing an example of control signals controlling the valve.

In the above embodiment, in the fuel cell system, the flow amount control is executed by varying the duty ratios of the control signals S11 and S12 inputted to the valves 22 and 23. Additionally, by adding a phase difference between the control signals S11 and S12, the pulsation can be introduced to the flow of the hydrogen passing through the valves 22 and 23 into the anode 14. FIG. 6 is a concrete example of the control signals S11 and S12 supplied to the valves 22 and 23 by the ECU 40. FIG. 6 shows a case that the duty ratios of the valves 22 and 23 are identical, for convenience of the illustration. At the upper portion in FIG. 6, the control signal S11 to the valve 22 is shown, and at the lower portion, the control signal S12 to the valve 23 is shown. As shown in FIG. 6, between the control signals S11 and S12, a phase difference PD is introduced. By such flow amount control, the pulsation can be introduced to the flow of the hydrogen in the anode 14. Thereby, the diffusion of the impurities in the anode 14, the prevention of the flooding and the dryout can be more effectively realized.

As described above, when the valves 22 and 23 can adjust the opening degree amount, the ECU 40 may execute the flow control in order to diffuse the impurities in the anode 14 by adjusting the opening degree amounts of the valves 22 and 23.

[Flow Amount Control Process]

Next, the description will be given of a flow amount control process according to the present embodiment. It is noted that the flow amount control process is executed mainly by the ECU 40. In addition, the flow amount control process is repeatedly executed with a predetermined period during the operation of the fuel cell stack 10.

Figure 7:
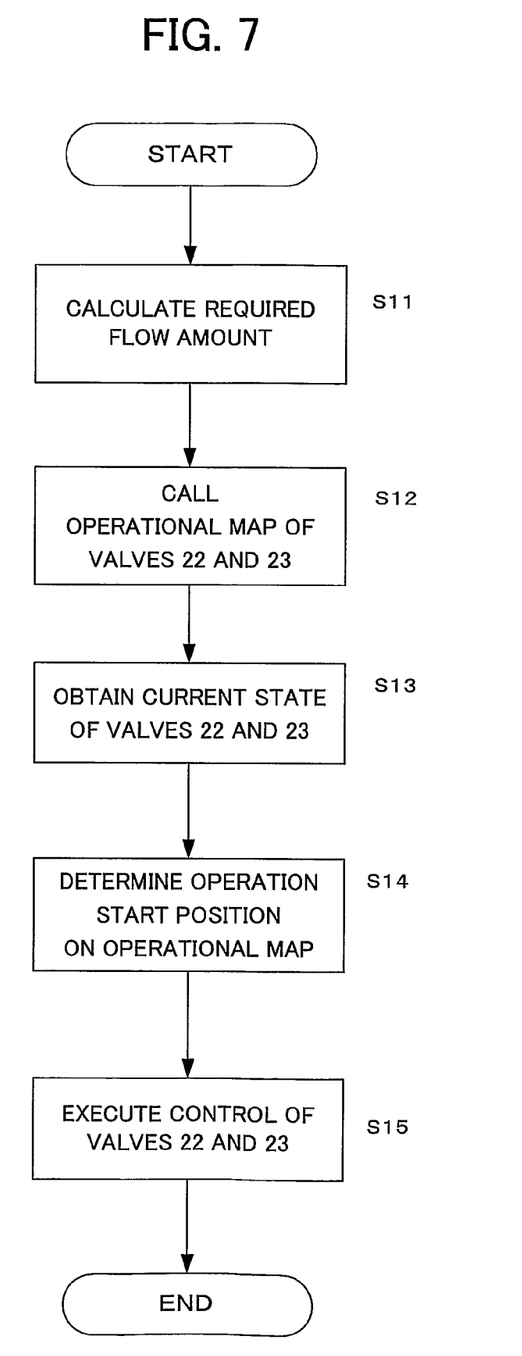
FIG. 7 is a flow chart showing a flow amount controlling process according to the embodiment of the present invention.

FIG. 7 is a flow chart showing the flow amount control process according to the present embodiment.

First, in step S11, the ECU 40 calculates the flow amount of the hydrogen to be supplied to the anode 14 (hereinafter also referred to as "required flow amount"). Based on the current power generation amount of the fuel cell stack 10, the ECU 40 calculates the required flow amount. Namely, the ECU 40 serves as a flow amount calculating unit which calculates the required flow amount of the fuel gas to be supplied to the anode 14. When the above process is completed, the process goes to step S12.

In step S12, the ECU 40 accesses an operational map showing a time chart of the required flow amount of the hydrogen to pass through the valves 22 and 23. In a memory and the like in the ECU 40, several kinds of operational maps are stored in advance. Based on the amount of the hydrogen to be supplied, which is calculated in step S11, the ECU 40 calls the optimum operational map from the several kinds of operational maps.

Figure 8:
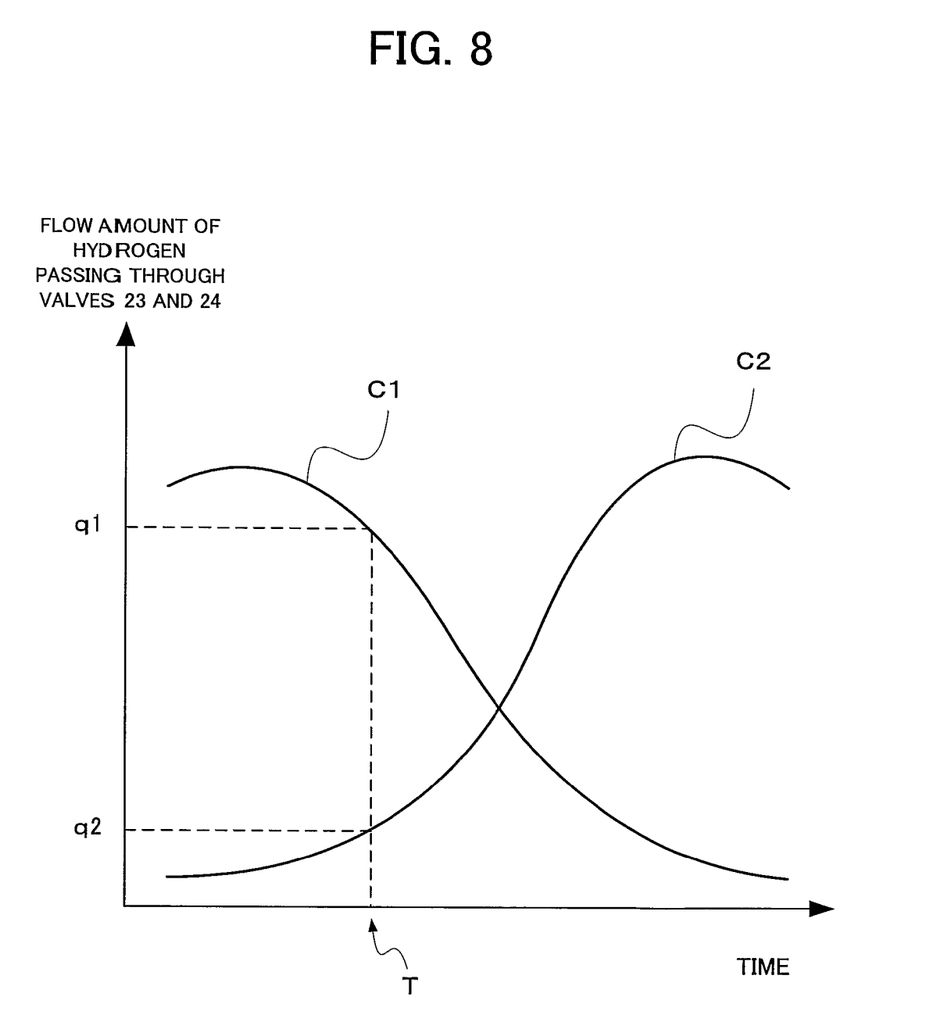
FIG. 8 is a graph showing an example of an operational map used for the flow amount controlling process.

FIG. 8 shows a concrete example of the operational map. A curve C1 shows the flow amount of the hydrogen to pass through the valve 22, and a curve C2 shows the flow amount of the hydrogen to pass through the valve 23. As for the operational map, if the required flow amount is same as that of the previous time, the waveform used at the previous time can be repeatedly used. Namely, the flow amounts of the hydrogen passing through the valves 22 and 23 periodically vary. The flow amount obtained as the sum of the flow amount q1 of the hydrogen to pass through the valve 22 and a flow amount q2 of the hydrogen to pass through the valve 23 at a certain timing T is equal to the required flow amount of the hydrogen to be supplied to the anode 14 calculated in step S11.

Returning to FIG. 7, the flow amount control process will be explained. When the above-mentioned process in step S12 ends, the process goes to step S13. In step S13, the ECU 40 obtains the current states of the valves 22 and 23. For example, the ECU 40 obtains the current opening and closing states of the valves 22 and 23. Namely, the ECU 40 obtains whether the valves 22 and 23 are open or closed. When the above process ends, the process goes to step S14.

In step S14, based on the current states of the valves 22 and 23 obtained in step S13, the ECU 40 determines an operation start position on the operational map called in step S12. Then, the process goes to step S15.

In step S15, according to the flow amount shown in the operational map called in step S12, the ECU 40 executes the control of the valves 22 and 23 from the operation start position on the operational map determined in step S14.

As described above, if the ECU 40 controls the flow amount of the hydrogen to pass through the valves 22 and 23 in accordance with the operational map prepared in advance, the impurities in the anode 14 can be effectively diffused. Thereby, since the hydrogen purge amount can be reduced, the efficiency of using the fuel cell stack 10 can be improved.

[Modification]

Next, the description will be given of modifications relating to the configuration of the above-mentioned fuel cell system 100.

Figure 9:
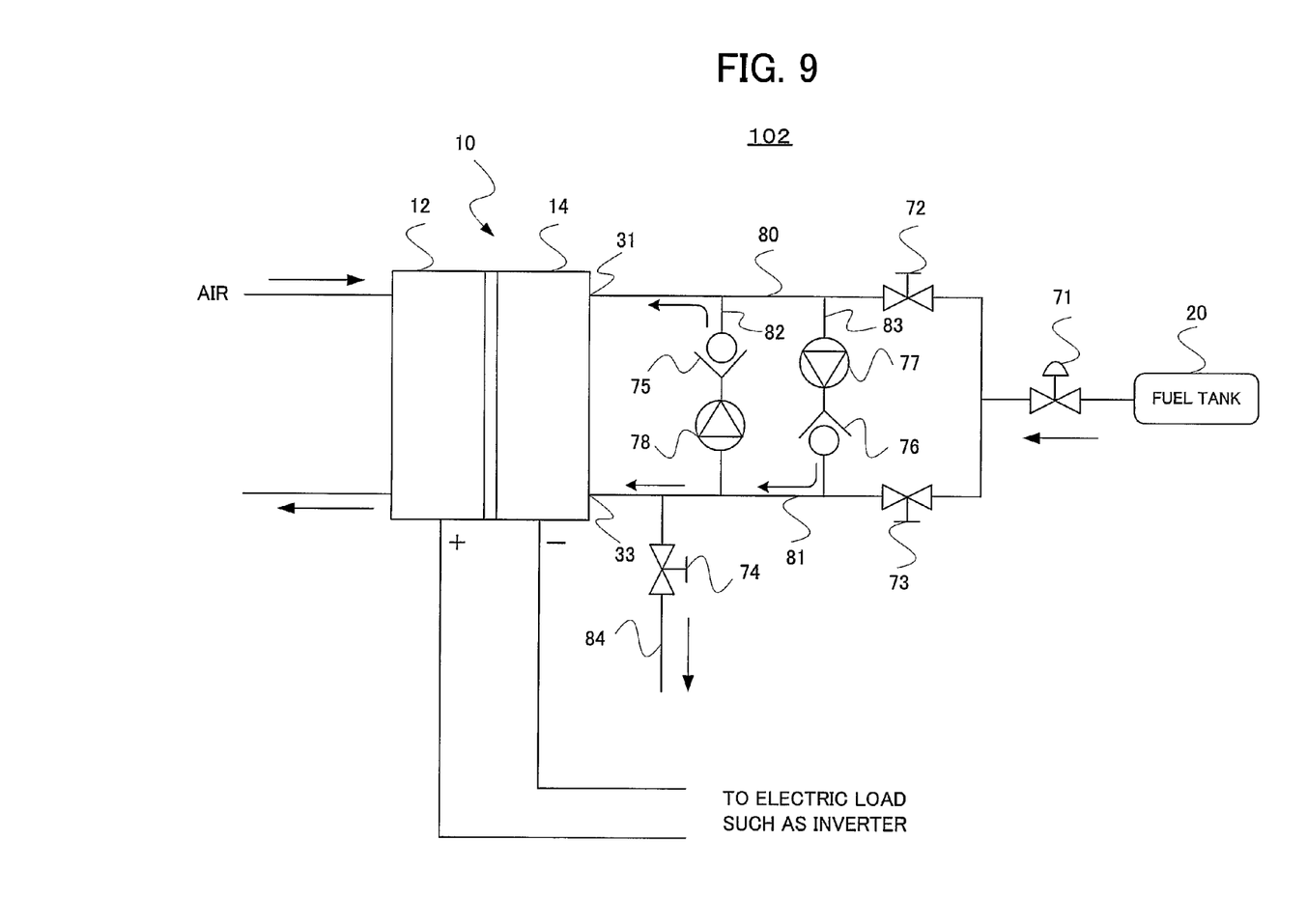
FIG. 9 is a block diagram showing a schematic configuration of a fuel cell system according to a modification of the present invention.

FIG. 9 is a block diagram schematically showing a configuration of a fuel cell system 102 according to a modification of the present invention. The basic configuration of the fuel cell system 102 is similar to the configuration of the fuel cell system 100. In addition, they are similar in the point that the hydrogen is supplied from two supply openings to the anode 14. However, between the fuel cell systems 102 and 100, arrangement of the valves and components in a hydrogen supplying system supplying the hydrogen to the anode 14 are different. Therefore, the description will be mainly given of the hydrogen supplying system of the fuel cell system 102 below. The hydrogen supplying system of the fuel cell system 102 is constructed by valves 72 to 76, pumps 77 and 78 and flow passages 80 to 84. The valve 71 is a valve for adjusting the pressure, the valves 72 to 74 are two-way valves, and the valves 75 and 76 are check (nonreturn) valves. The valve 72 is provided in the flow passage 80, the valve 73 is provided in the flow passage 81, and the valve 74 is provided in the flow passage 84. The flow passages 80 and 81 are bypassed by the flow passages 82 and 83. The check valve 75 and the pump 78 are provided in the flow passage 82, and the pump 77 and the check valve 76 are provided in the flow passage 83.

In the fuel cell system 100 shown in FIG. 1, the hydrogen flow amount supplied to the anode 14 by the valves 22 and 23 having a flow amount adjusting function is adjusted. On the contrary, in the example of FIG. 9, the valves 72 and 73 are the opening and closing valves having no flow amount adjusting function. By a combination of the valve 72, the pump 78 and the check valve 75, the hydrogen flow amount from the hydrogen supply opening 31 to the anode 14 is controlled. By a combination of the valve 73, the pump 77 and the check valve 76, the hydrogen flow amount from the hydrogen supply opening 33 to the anode 14 is controlled. Namely, the hydrogen flow amount is controlled by controlling the output of the pumps 77 and 78. It is noted that the above-mentioned valves and pumps are controlled by an ECU (not shown).

Figure 10:
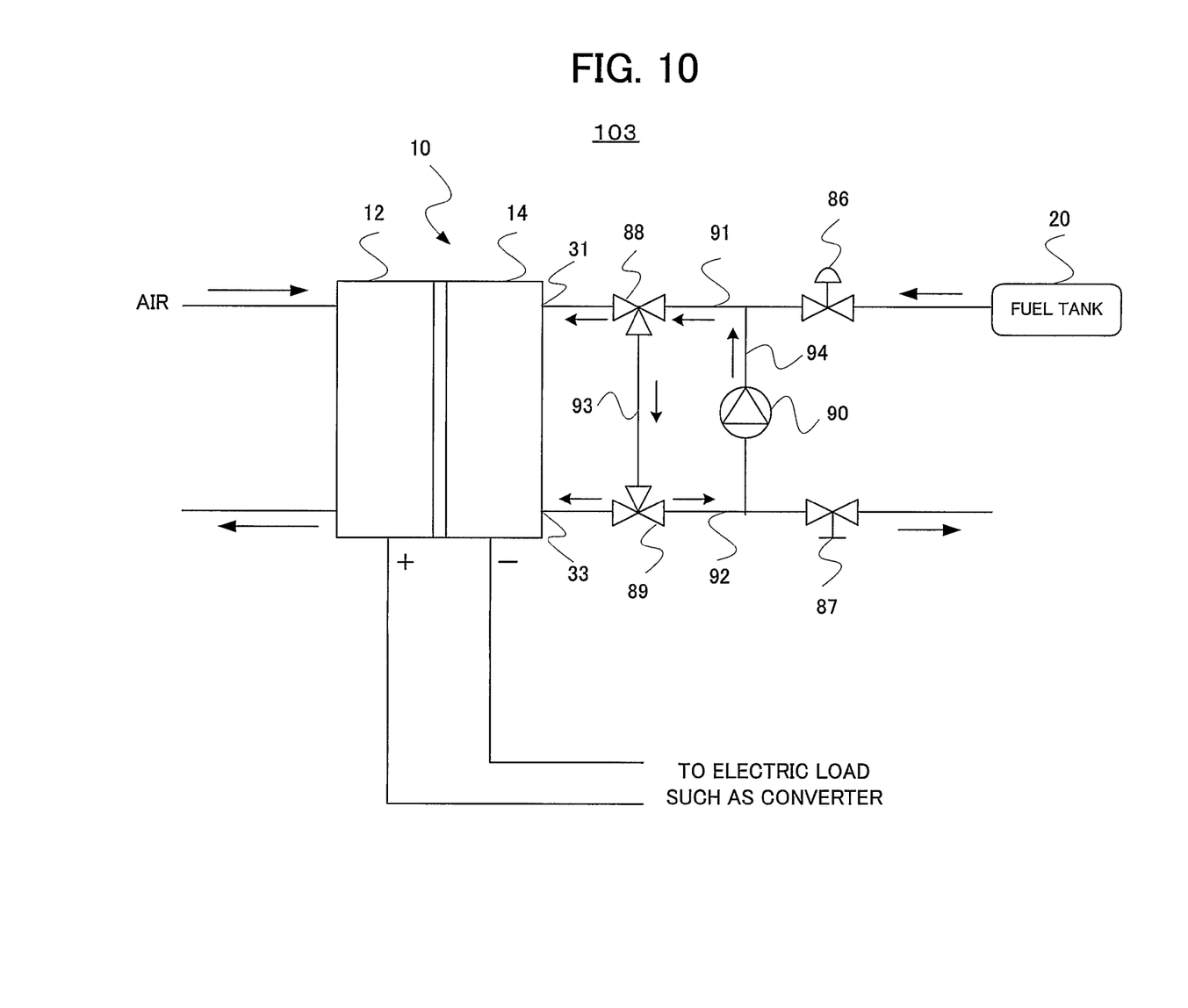
FIG. 10 is a block diagram showing a schematic configuration of a fuel cell system according to another modification of the present invention.

FIG. 10 is a block diagram schematically showing a configuration of a fuel cell system 103 according to another modification of the present invention. In this modification, the fuel cell system 103 is different from the above-mentioned fuel cell system 100 in a point of the arrangement of the valve and components in the hydrogen supplying system which supplies the hydrogen to the anode 14. Therefore, the description will be mainly given of the hydrogen supplying system of the fuel cell system 103 below. The hydrogen supplying system of the fuel cell system 103 is constructed by valves 86 to 89, a pump 90 and flow passages 91 to 94. The valve 86 is a valve for adjusting the pressure, the valve 87 is a two-way valve, and the valves 88 and 89 are three-way valves. The valves 86 and 88 are provided in the flow passage 91, and the valves 87 and 89 are provided in the flow passage 92. The flow passages 91 and 92 are bypassed by the flow passage 93 via the valves 88 and 89, and are further bypassed by the flow passage 94 in which the pump 90 is provided.

In the fuel cell system 100 shown in FIG. 1, the hydrogen flow amount supplied to the anode 14 is adjusted by the valves 22 and 23 having the flow amount adjusting function. On the contrary, in the example of FIG. 10, by the three-way valves 88 and 89 and the pump 90, the hydrogen flow amount supplied to the anode 14 is controlled, as shown by arrows in FIG. 10. Namely, the hydrogen flow amount is controlled by controlling the output of the pump 90 and the opening and closing directions of the valves 88 and 89. It is noted that the above-mentioned valves and pump are controlled by an ECU (not shown).

As described above, based on the fuel cell systems 102 and 103 according to the modifications, by supplying the hydrogen from the two positions into the anode 14 and controlling the flow amounts of the supplied hydrogen, the impurities in the anode 14 can be diffused. Therefore, the hydrogen purge amount can be reduced, and the efficiency of using the fuel can be improved. In addition, it becomes possible to prevent the flooding and dryout in the fuel cell stack 10.

Industrial Applicability

This invention is applicable to a fuel cell system for various uses, including the use in a fuel cell automobile.

The invention claimed is:

1. A fuel cell system comprising:
    a fuel cell stack having an anode and a cathode;
    a first supply passage and a second supply passage that communicate with each other in the fuel cell stack and supply fuel gas to the anode;
    an exhaust passage that is connected to the second supply passage and discharges exhaust gas from the anode;
    an opening and closing unit that opens and closes the exhaust passage; and
    a flow amount controlling unit that controls flow amounts of the fuel gas passing through the first supply passage and the second supply passage, wherein fuel gas supplied via the first supply passage and fuel gas supplied via the second supply passage meet each other in counter-directional flow within the anode to form an extreme downstream position of the fuel gas, and
    wherein the flow amount controlling unit executes a control for supplying fuel gas to the anode in simultaneous flow from both the first supply passage and the second supply passage and varies a ratio between the flow amounts passing through the first supply passage and the second supply passage over time when the exhaust passage is closed to actively control the location of the extreme downstream position of the fuel gas within the anode and controls the flow amount such that the extreme downstream position of the fuel gas coincides with a position at which the exhaust passage is connected to the second supply passage when the opening and closing unit is open.

2. The fuel cell system according to claim 1, wherein the first and the second supply passages are provided such that the fuel gas supplied from the first supply passage and the second supply passage flow in opposite directions within the anode.

3. The fuel cell system according to claim 1, wherein the flow amount controlling unit controls the flow amounts such that the flow amounts of the fuel gas vary intermittently.

4. The fuel cell system according to claim 3, wherein the flow amount controlling unit controls a time period in which the fuel gas is supplied to the anode through the first supply passage and a time period in which the fuel gas is supplied to the anode through the second supply passage.

5. The fuel cell system according to claim 1, further comprising a flow amount calculating unit that calculates a required flow amount of the fuel gas to be supplied to the fuel cell stack based on a state of the fuel cell stack,
  wherein the flow amount controlling unit controls the flow amounts of the fuel gas such that a total of the flow amounts of the fuel gas supplied from the first and the second supply passages to the anode corresponds to the required flow amount calculated by the flow amount calculating unit.

6. The fuel cell system according to claim 1, wherein the exhaust passage is connected to the second supply passage at a position between the fuel stack and the opening and closing unit.

7. A method of supplying fuel gas to a fuel cell system comprising a fuel cell stack having an anode and a cathode; a first supply passage and a second supply passage that communicate with each other in the fuel cell stack and supply fuel gas to the anode; and an exhaust passage that is connected to the second supply passage and discharges exhaust gas from the anode, the method comprising the steps of:
  a step of opening and closing the exhaust passage; and
  a step of controlling flow amounts of the fuel gas passing through the first supply passage and the second supply passage, wherein fuel gas supplied via the first supply passage and fuel gas supplied via the second supply passage meet each other in counter-directional flow within the anode to form an extreme downstream position of the fuel gas, and
  the step of controlling flow amounts executes a control for supplying fuel gas to the anode in simultaneous flow from both the first supply passage and the second supply passage and varies a ratio between the flow amounts passing through the first supply passage and the second supply passage over time when the exhaust passage is closed to actively control the location of the extreme downstream position of the fuel gas within the anode and controls the flow amount such that the extreme downstream position of the fuel gas coincides with a position at which the exhaust passage is connected to the second supply passage when the opening and closing unit is open.

* * * * *